UNITED STATES PATENT OFFICE.

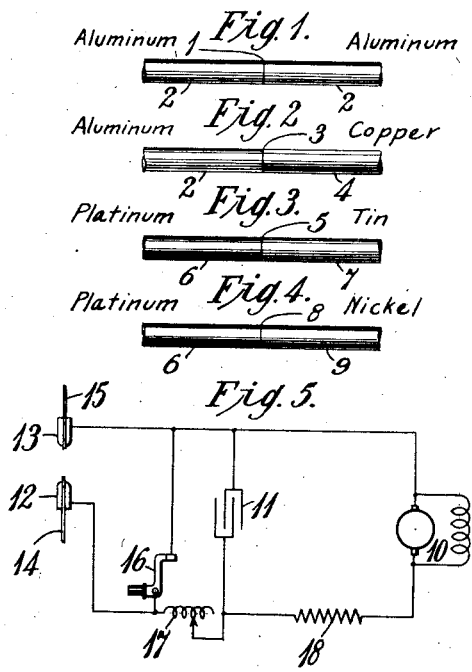

LEWIS W. CHUBB, OF EDGEWOOD PARK, PENNSYLVANIA, ASSIGNOR TO WESTING-HOUSE ELECTRIC AND MANUFACTURING COMPANY, A CORPORATION OF PENNSYLVANIA.

WELDED METAL.

1,196,744.   Specification of Letters Patent.   Patented Aug. 29, 1916.

Original application filed February 16, 1912, Serial No. 678,108. Divided and this application filed February 7, 1913. Serial No. 746,784.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Welded Metals, of which the following is a specification, this application being a division of my application, Serial No. 678,108, filed February 16, 1912, which has matured into Patent No. 1,066,468, granted July 8, 1913.

My invention relates to welded metals, and it has for its object to provide a welded union or joint between either like or unlike metals that shall be ductile and as strong and durable as any part of either of the welded bodies.

Copper and iron wire, rods and bars have been successfully welded for many years by forcing or clamping the conductors into engagement with each other and passing electric current through the junction until the necessary heat has been generated for fusing the members together. Great difficulty has, however, been experienced in welding aluminum conductors by the usual methods, and it has heretofore been considered practically impossible to obtain a ductile joint between unlike metals, such, for example, as aluminum and copper which tend to form a very brittle alloy with each other when united in certain proportions. It has also been considered practically impossible to weld two metals, such as tin and platinum, having two very widely different melting points.

I believe that the difficulty heretofore experienced in welding aluminum bodies was mainly due to the fact that their surfaces oxidized with extreme rapidity, and, consequently, although the surfaces to be welded were carefully cleaned, they became recoated with a thin oxid film before it was possible to weld them.

Ordinary methods of welding, by the use of electric current or otherwise, are obviously unadapted for uniting such metals as tin and platinum, or other unlike metals which melt at widely different temperatures, since the metal having the lower melting point is invariably overheated or becomes a liquid before the other metal even approaches a welding temperature. Ordinary methods are also ineffective for producing satisfactory welds between copper and aluminum or other metals which tend to form brittle alloys, it having been found that, for a considerable distance on each side of the junction point, alloys of the two metals are produced, the proportions varying from the junction outward until points are reached where each metal is free from the other. It is therefore evident that, if the two metals produce a brittle alloy when united in any proportions, there will be at least one section on each side of the joint where the brittle alloy appears and where the welded structure is very liable to break.

According to my present invention, I overcome the difficulties heretofore encountered by concentrating relatively large quantities of both electrical and mechanical energy at the point of engagement between the members to be welded for an almost inappreciable length of time.

The specific method which I have found most effective and desirable consists in connecting the conducting bodies which are to be welded to the terminals of a condenser which has been suitably charged with electrical energy and then bringing them into percussive engagement simultaneously with an explosive condenser discharge between them. On account of the great heat intensity that can be concentrated at the desired point for a very short period of time by a condenser discharge, the welding heat thus produced is particularly effective, but the locally applied heat which is utilized in conjunction with percussive engagement of the bodies to be welded may be otherwise produced if of sufficient intensity and applied in a proper manner. The effect of the concentration of energy above referred to on aluminum conductors is to vaporize a very small quantity of the aluminum on the engaging surfaces, thereby blowing out laterally in all directions the vaporized material and carrying off, or at least breaking up, the oxid film which has hitherto prevented the welding of aluminum successfully. In welding unlike metals which produce, when united in ordinary ways, a brittle alloy, the energy and heat are so concentrated and are continued for such a very short interval of time that there is no appreciable flowing of one metal into the other, the line of demarcation being very sharp, even when the united bodies are rolled out into a very thin plate or foil, and the joint is viewed through a microscope. If a film of brittle alloy is produced at the joint, the film is so thin that it is flexible. This is true of various combinations of metals, such as tin and aluminum, copper and platinum, lead and tin, tin and platinum, tin and copper, and nickel and platinum, but perhaps the most remarkable instance is the uniting of copper and aluminum, since these metals, when united by heretofore known methods, produced joints which are as brittle as glass.

In the accompanying drawings, Figures 1, 2, 3 and 4 illustrate joints between wires or rods of various metals which embody my invention, and Fig. 5 is a diagram of electrical apparatus and circuits adapted for use in making welds or joints in accordance with my invention.

In Fig. 1 is shown a joint or weld 1 between two aluminum wires 2; in Fig. 2, a similar joint or weld 3 between an aluminum wire 2 and a copper wire 4; in Fig. 3, a weld or joint 5 between a platinum wire 6 and a tin wire 7, and in Fig. 4, a joint or weld 8 between a platinum wire 6 and a nickel wire 9.

It will be noted that welds or joints having the characteristics of my invention may be made between metals other than those indicated and that the invention is not limited to welds or joints between metal bodies of any specific form or size. I have found my invention most useful in connection with metals of unlike characteristics or those which it has been heretofore found impossible or impracticable to weld by other means or methods than those practised by me on account of the rapid oxidation, but welds having the characteristics here set forth may be made between bodies composed of metals or alloys having like properties, or those which may also be welded together by the means and methods heretofore employed in the art.

Referring now to Fig. 5, energy is supplied from any suitable source, such as a generator 10, to a condenser 11, the terminals of which are connected to suitable chucks 12 and 13 for holding the wires 14 and 15, the ends of which are to be welded together, the chucks 12 and 13 constituting the terminals of the welding machine. A switch 16 is provided to normally complete a short circuit across the welding terminals, so that an attendant may safely clamp the wires to be welded in the chucks and otherwise make necessary preparations for producing a welded joint. A variable or adjustable inductance 17 is included in the welding circuit and an ohmic resistance 18 is included in the charging circuit of the condenser 11 in order to avoid short circuiting the generator 10 through the welding contacts.

The welding together of the conductors 14 and 15 is effected by bringing their adjacent surfaces into percussive engagement and thereby effecting a discharge of the condenser 11 at the instant of contact between the conductors, the energy thus concentrated at the surfaces of contact being sufficiently great to produce a perfect ductile weld between the two bodies. On account of the instantaneous application of intense heat to the surfaces to be welded, at substantially the instant of percussive engagement between such surfaces, there is no opportunity for such dissipation of the applied heat as to destroy or impair the welding function, even though the actual welded surface of one of the bodies is only a small fraction of the surface area of which the welded surface is a part. Such conditions would obtain in welding the end of a wire or rod to the surface of a plate or block.

In the appended claims, the expression "electro-percussively formed" is to be understood as referring to welding methods in which the parts to be welded are brought together percussively with the simultaneous passage of electric current through their point of engagement, as distinguished from methods in which the bodies to be welded are heated independently before the welding operation.

I claim as my invention:

1. A structure comprising a plurality of metal bodies joined by an electro-percussively formed weld.

2. A structure comprising a plurality of metal bodies joined by an electro-percussively formed malleable weld.

3. A structure including a plurality of metal bodies, at least one of which comprises aluminum, joined by a malleable weld.

4. An aluminum body and a copper body joined by a malleable weld.

5. A plurality of bodies, composed of metals that tend to form brittle joints when welded together, joined by a malleable weld.

6. A structure comprising a plurality of metal bodies, at least one of which comprises aluminum, joined by an electrically and percussively formed malleable weld.

In testimony whereof, I have hereunto subscribed my name this 30th day of January, 1913.

LEWIS W. CHUBB.

Witnesses:
O. W. A. OETTING,
B. B. HINES.